United States Patent [19]

Watanabe

[11] 4,287,551
[45] Sep. 1, 1981

[54] ELEVATOR TRACTION MACHINE

[75] Inventor: Eiki Watanabe, Inazawa, Japan

[73] Assignee: Mitsubishi Denki Kabushiki Kaisha, Tokyo, Japan

[21] Appl. No.: 60,108

[22] Filed: Jul. 24, 1979

[30] Foreign Application Priority Data

Jul. 26, 1978 [JP] Japan .................................. 53-91240

[51] Int. Cl.³ ............................................... H02H 1/00
[52] U.S. Cl. ..................................... 361/212; 307/145; 187/1 R
[58] Field of Search ................. 187/1 R, 20, 29 R, 94; 361/220, 212, 221, 216; 307/145

[56] References Cited

U.S. PATENT DOCUMENTS

| 1,490,271 | 4/1924 | Hecht, Jr. ............................. 187/1 R |
| 3,317,759 | 5/1967 | Grobel .................................. 361/212 |
| 3,873,886 | 3/1975 | Kato et al. ............................ 361/216 |

Primary Examiner—Robert J. Spar
Assistant Examiner—Kenneth Noland
Attorney, Agent, or Firm—Sughrue, Rothwell, Mion, Zinn and Macpeak

[57] ABSTRACT

An elevator traction machine including a main rope, a traction sheave, a DC motor controlled by a thyristor Leonard system, a brake wheel, bearings of motor shaft and a machine beam.

The motor shaft is grounded through first grounding circuit including a current collector for the shaft current induced by the switching operation of the thyristor, and through second grounding circuit including the bearings. The second grounding circuit includes a resistor to substantially prevent the flow of the shaft current through the bearings and to protect the bearings from the electrolytic corrosion.

13 Claims, 7 Drawing Figures

ELEVATOR TRACTION MACHINE

BACKGROUND OF THE INVENTION

This invention relates to improvements in an elevator traction machine, especially to improvements in the grounding system.

FIG. 1 shows a conventional elevator traction machine driven by an electric motor controlled by a thyristor Leonard system. In FIG. 1, reference characters R, S and T designate a three-phase AC supply. An armature $2a$ of a DC motor M (the field not shown) has the applied voltage controlled by a semiconductor switching circuit 1, such as a thyristor converter. The motor M has an electrical conductive shaft 3. The shaft 3 is supported by electrically conductive bearings 7, 8 that are supported by electrical conductive bearing stands 71, 81 disposed on an electrically conductive machine beam 4. The machine beam 4 is set through vibration-proof, non-conductive rubber members 5 in a machine room.

A grounding line 6 is used to ground the machine beam 4. This is in accordance with Japanese Industrial Standards for Electrical Equipment Installation. Accordingly, the shaft 3 is grounded through the bearings 7, 8, the bearing stands 71, 81, the machine beam 4, and the grounding line 6. A conductive traction sheave 9 is fixedly mounted on the shaft 3. A deflection sheave 10 is mounted on and fixedly secured to a shaft 11. Bearings 12 and 13 support the shaft 11 on the machine beam 4. A main rope 14 is wound on both the traction sheave 9 and the deflection sheave 10. A cage 15 and a counterweight 16 are connected to the main rope 14 at respective ends thereof. The shaft 3 is also grounded through the traction sheave 9, the main rope 14, the deflection sheave 10, the shaft 11, the bearings 12, 13, the machine beam 4, and the grounding line 6.

A stray capacitance 17 may be formed between the armature $2a$ and the shaft 3 thereof and stray capacitances 18, 19 and 20 may be formed between the supply lines $L_R$, $L_S$, $L_T$ and ground. This is well known in the art.

It is well known in the art that, when an electric motor is controlled by a high-speed switching element such as a thyristor, then shaft current flows in the electric motor. More specifically, when the thyristor convertor 1 is operated, a pulsive current flows through a circuit

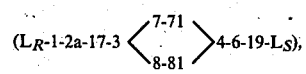

and/or a different circuit

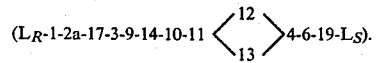

In general, the bearings 7, 8, 12 and 13 are ball-and-roller bearings. Therefore, when the shaft current flows in these bearings, the surfaces of the balls or the rollers are electrolytically corroded, and the balls or the rollers are quickly damaged.

In order to prevent or lessen the flow of the shaft current through the bearings 7, 8, 12 and 13, a current collector 22 is provided, as shown in FIG. 2. The current collector contacts with the shaft 3 of the electric motor 2 and is grounded through a grounding line 23.

However, this method is disadvantageous in that the current flowing in the bearings 7, 8, 12 and 13 is not significantly decreased depending on the contact resistance of the current collector 22. Also, maintaining the contact resistance at desired low value is troublesome.

SUMMARY OF THE INVENTION

According, an object of this invention is to eliminate all of the above-described difficulties in the prior art.

More specifically, an object of the invention is to provide an elevator traction machine having a grounding device in which the shaft current of the electric motor does not substantially flow through the bearings.

It is another object of this invention to provide an elevator traction machine where the shaft bearings are protected from damage due to electrolytic corrosion.

These objects of the present invention have been attained by providing an elevator traction machine comprising a main rope connected to an elevator cage and a counterweight at both ends thereof respectively. A traction sheave has the main rope trained thereover and a motor controlled by a semiconductor switching circuit drives the traction sheave to vertically move the elevator cage and the counterweight in opposite directions. A brake wheel is coupled to a shaft of the motor and is frictionally forced to brake the motor during the stop of the cage. Bearings for supporting the motor shaft are provided. A current collector is in contact with the motor shaft or a rotary member, such as the sheave or the brake wheel, for collecting shaft current. A first grounding circuit is employed for grounding the shaft through the shaft via the current collector. A second grounding circuit grounds the shaft through at least one of the bearings. Hence, the impedance of the second grounding circuit is greater than that of the first grounding circuit.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 3:
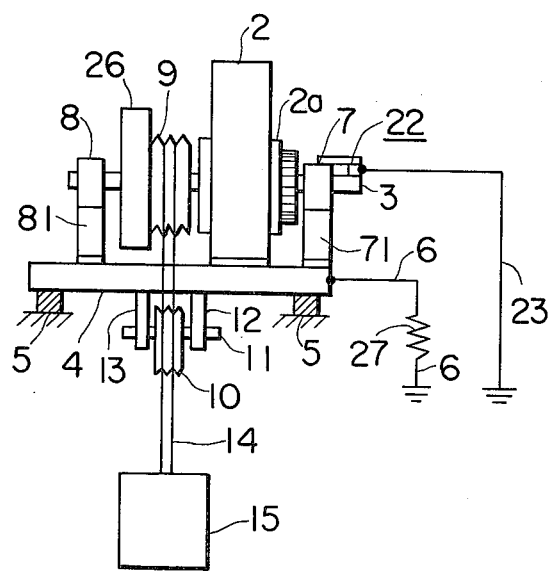
FIG. 3 is a explanatory diagram showing the arrangement of one embodiment of an elevator traction machine having a device for grounding, according to this invention.
Figure 4:
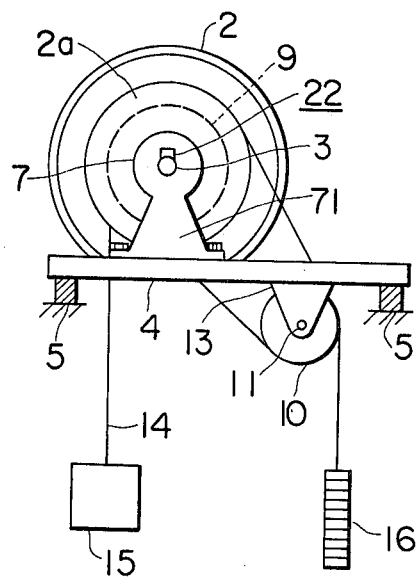
FIG. 4 is a side view from the righthand side showing the arrangement of the elevator traction machine of FIG. 3.
Figure 5:
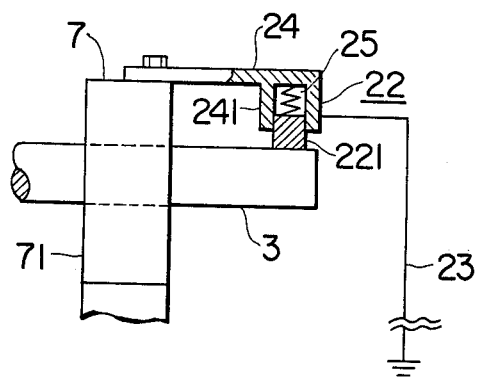
FIG. 5 is a fragmental elevational view, partially in section, showing the arrangement of the current collector of the invention.

FIGS. 3 through 5, show a first preferred embodiment of this invention. In this embodiment, as shown in FIG. 5 a current collector (22) includes a conductive brush holder (24), spring (25), and brush (221). The brush holder (24) holds a brush (221) in a brush housing (241) in sliding contact with an end portion of the shaft (3). One end of the brush holder (24) is fixed on the bearing stand (71) using a fastener means, such as a bolt. The brush holder (24) is directly grounded by a grounding line (23). The spring (25) disposed in the housing (241) presses the brush (221) toward the shaft (3) to make and maintain good electrical contact. The brush (221), which is slidably retained by the holder (24), contacts to the holder (24) directly or via the conductive spring (25). The current collector (22) and the grounding line (23) compose a first grounding circuit to ground the shaft.

A brake wheel (26) integral with the sheave (9) as shown in FIG. 3 is frictionally forced at its outer round surface by braking elements, such as brake-shoes (not shown), for stopping the cage (15).

Figure 1:
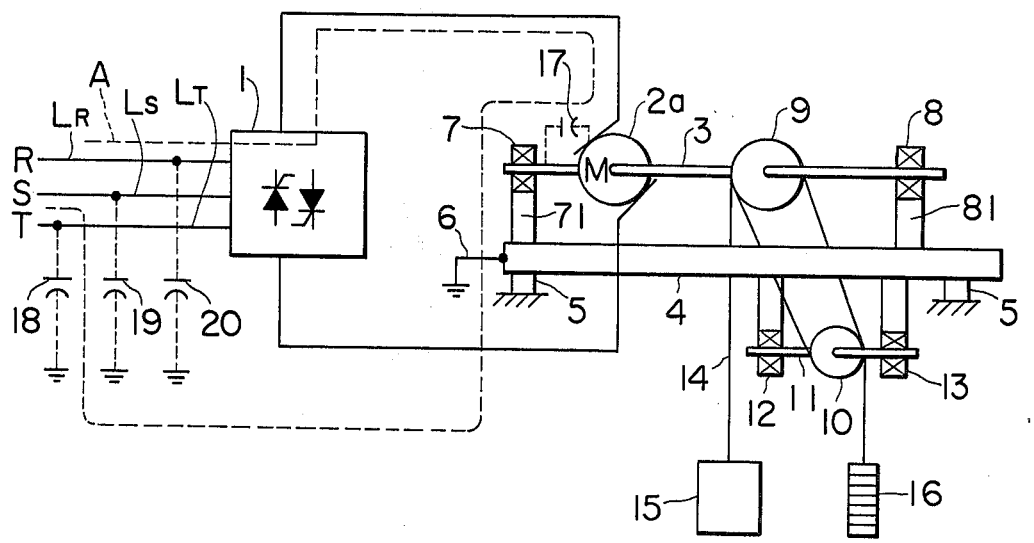
FIG. 1 is a explanatory diagram showing one example of the arrangement of a conventional elevator traction machine.
Figure 2:
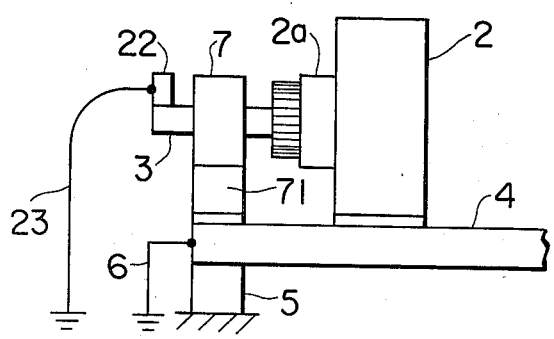
FIG. 2 is a fragmentary elevational view showing another example of a conventional machine.

The machine beam (4) is grounded through a grounding resistor (27) serially connected in the grounding line (6). The resistor (27) has a resistance, preferably several ohms, which is permitted in third or special third class grounding work (EEIS, Japan). The other components shown in FIGS. 3 through 5 are similar to those in FIGS. 1 and 2.

The bearings (7) and (8), the bearing stands (71) (81), the machine beam (4), the grounding line (6), and the grounding resistor (27) compose a second grounding circuit to ground the shaft (3). The second grounding circuit, however, may be either of the circuit beginning from the bearing (7) or the bearing (8).

In the arrangement shown in FIGS. 3 through 5, the total resistance of the first grounding circuit including contact resistance between the shaft (3) and the current collector (22) is much smaller than that of the second grounding circuit including the grounding resistor (27).

Accordingly, the shaft current flows primarily to ground through the first grounding circuit, and does not substantially flow through the second grounding circuit.

Figure 6:
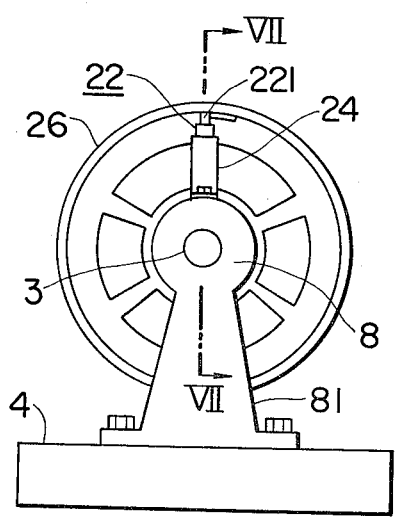
FIG. 6 is a side view from the lefthand side showing the arrangement of a second embodiment of the invention.
Figure 7:
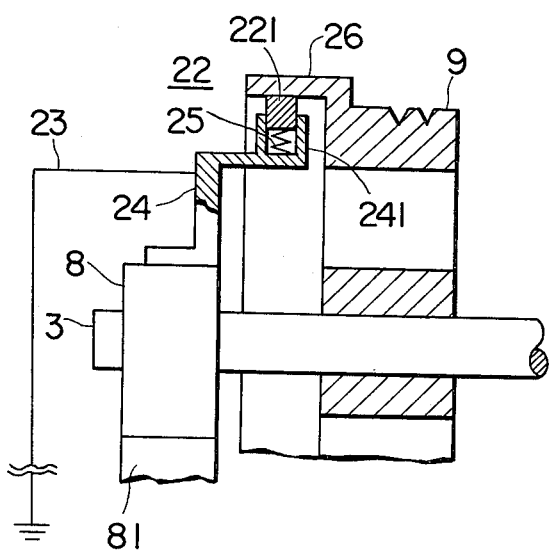
FIG. 7 is an enlarged, fragmental elevational view, partially in section, of the arrangement of FIG. 6, taken between and in the direction of arrows VII—VII.

FIGS. 6 and 7 show another embodiment of this invention. In this arrangement of the current collector (22), the electrically conductive brush (221), such as carbon-brush, is held slidably in the cylindrical housing (241) of the conductive brush holder (24) secured to the bearing stand (81). The brush is pressed on the circular inner surface of the conductive brake wheel (26) by the spring (25). The other components shown in FIGS. 6 and 7 are similar to those in FIGS. 1 through 5.

In the arrangement, the shaft current flows from the shaft (3) to ground primarily through a first grounding circuit composed of the sheave (9), brake wheel (26), brush (221), brush holder (24), and grounding line (23).

The second embodiment shown in FIGS. 6 and 7 has advantages in that the longitudinal dimension of the shaft (3) is smaller than that of the first embodiment shown in FIGS. 3 through 5. This results in easy installation of the traction machine.

In the other embodiments of this invention, the first grounding circuit may be composed of a high impedance grounding line without any resistor. That is resistor (27) may be eliminated. Furthermore, the brush (221) may be pressed on the outer or side surface of the brake wheel (26) or the surfaces of the sheave (9). In other words, the brush (221) may be in contact with any of the conductive rotary members, such as the brake wheel or the sheave, coupled to and driven by the motor shaft since these elements are all electrically coupled. Furthermore, an A.C. motor controlled by the thyristor converter may be used instead of the D.C. motor in the embodiments of this invention.

In accordance with this invention, the first grounding circuit for grounding the motor shaft, including the current collector in contact with the motor shaft or the rotary member, has a smaller impedance than that of the second grounding circuit through the bearing. Then, the shaft current induced by the switching operation of the semiconductor switching device does not substantially flow through the bearings. Therefore, the bearings are protected from damage due to electrolytic corrosion.

It is apparent that numerous additional modification of the present invention are possible in light of the above teachings.

What is claimed is:

1. An elevator traction machine comprising:
   a main rope connecting an elevator cage and a counterweight,
   traction sheave having said main rope entrained thereover,
   a motor controlled by a semiconductor switching circuit for driving said traction sheave to vertically move said elevator cage and said counter weight in opposite directions,
   A brake wheel coupled to a shaft of said motor, said brake wheel being frictionally forced to brake said motor during the stop of the cage,
   bearings for supporting said motor shaft,
   a current collector in contact with said motor shaft for collecting shaft current,
   a first grounding circuit for grounding said shaft through said current collector, and
   a second grounding circuit for grounding said shaft through at least one of said bearings,
   wherein the impedance of said second grounding circuit is greater than that of said first grounding circuit.

2. An elevator traction machine of claim 1 further comprising;
   a machine beam for supporting said motor and said bearings and, wherein said second grounding circuit grounds said shaft through at least one of said bearings through said machine beam.

3. An elevator traction machine as in claims 1 or 2 wherein said first grounding circuit directly grounded said current collector, and said second grounding circuit grounds at least one of said bearings through a resistor.

4. An elevator traction machine comprising;
   a main rope connected to an elevator cage and a counterweight,
   a motor controlled by a semiconductor switching circuit for vertically moving said elevator cage and counterweight in opposite directions,
   rotary members coupled to a shaft of said motor,
   bearings for supporting said motor shaft,
   a current collector being in contact with at least one of said rotary members for collecting shaft current,
   a first grounding circuit for grounding said shaft through said current collector, and a second grounding circuit for grounding said shaft through at least one of said bearings, wherein the impedance of said second grounding circuit is greater than that of said first grounding circuit.

5. An elevator traction machine of claim 4 further comprising;

a machine beam for supporting said motor and said bearings, and wherein, second grounding circuit grounds said shaft through at least one of said bearings through said machine beam.

6. An elevator traction machine as in claims 4 or 5 wherein at least the one of said rotary members, is a traction sheave having said main rope entrained thereover.

7. An elevator traction machine as in claims 4 or 5 wherein at least the one of said rotary members, is a brake wheel frictionally forced to brake said motor during the stop of the cage.

8. An elevator traction machine as in claims 4 or 5 wherein said first grounding circuit directly grounds said current collector, and said second grounding circuit grounds at least one of said bearings through a resistor.

9. In an elevator system having a cage and an electric motor drive system for raising the cage, said motor drive system including a motor shaft, a brake and bearings for supporting said shaft, the improvement comprising;

a current collector in contact with said electric motor drive system for collecting shaft current, a first grounding circuit for grounding said shaft through said current collector, and a second grounding circuit for grounding said shaft through at least one of said bearings, wherein the impedance of said second grounding circuit is greater than that of said first grounding circuit.

10. The system of claim 9 wherein said current collector comprises a housing, an electrical conductive brush and means to urge said brush into contact with said electric motor drive system.

11. The system of claim 10 wherein said brush is in contact with said motor shaft.

12. The system of claim 10 wherein said brush is in contact with said brake.

13. The system of claim 9 further comprising a machine beam and a resistor in said second grounding circuit, wherein said second grounding circuit grounds said shaft through said machine beam.

* * * * *